(12) United States Patent
Ferentz et al.

(10) Patent No.: US 7,895,456 B2
(45) Date of Patent: Feb. 22, 2011

(54) REDUCED GUARD BAND FOR POWER OVER ETHERNET

(75) Inventors: Alon Ferentz, Bat Yam (IL); Roni Blaut, Netanya (IL); David Pincu, Holon (IL); Simon Kahn, Jerusalem (IL)

(73) Assignee: Microsemi Corp. - Analog Mixed Signal Group Ltd, Hod Hasharon (IL)

( * ) Notice: Subject to any disclaimer, the term of this patent is extended or adjusted under 35 U.S.C. 154(b) by 685 days.

(21) Appl. No.: 11/934,798

(22) Filed: Nov. 5, 2007

(65) Prior Publication Data

US 2008/0114998 A1 May 15, 2008

Related U.S. Application Data

(60) Provisional application No. 60/865,432, filed on Nov. 12, 2006.

(51) Int. Cl.
*G06F 1/32* (2006.01)
(52) U.S. Cl. .......................... 713/300; 713/330
(58) Field of Classification Search ................ 713/300, 713/320, 322, 323, 324, 330
See application file for complete search history.

(56) References Cited

U.S. PATENT DOCUMENTS

| | | | |
|---|---|---|---|
| 4,467,314 A | 8/1984 | Weikel et al. | |
| 4,528,667 A | 7/1985 | Fruhauf | |
| 4,692,761 A | 9/1987 | Robinton | |
| 4,733,389 A | 3/1988 | Puvogel | |
| 4,799,211 A | 1/1989 | Felker et al. | |
| 4,815,106 A | 3/1989 | Propp et al. | |
| 4,885,563 A | 12/1989 | Johnson et al. | |
| 4,903,006 A | 2/1990 | Boomgaard | |
| 4,992,774 A | 2/1991 | McCullough | |
| 5,032,833 A | 7/1991 | Laporte | |

(Continued)

FOREIGN PATENT DOCUMENTS

WO 9623377 8/1996

OTHER PUBLICATIONS

Lynn K "Universal Serial Bus (USB) Power Management"; WESCON/97 Conference Proceedings, Santa Clara, CA, USA, Nov. 4-6, 1997; New York, N.Y.; IEEE Nov. 4, 1997 pp. 434-441 XP010254418.

(Continued)

*Primary Examiner*—Mark Connolly
*Assistant Examiner*—Paul B Yanchus, III
(74) *Attorney, Agent, or Firm*—Simon Kahn (57) ABSTRACT

A method of controlling a power over Ethernet system, the method comprising: sequentially powering a plurality of powered devices over communication cabling; determining a first total power consumption responsive to the powering of the plurality of powered devices; in the event that the determined first total power consumption exceeds a predetermined maximum power level, disabling power from at least one of the powered plurality of powered devices thereby reducing power consumption to less than the predetermined maximum power level; responsive to the disabling power, defining a connection power limit lower than the maximum power level by a guard band; monitoring a second total power consumption subsequent to the disabling power; and enabling power to a powered device only in the event the monitored second total power consumption is less than the connection power limit.

21 Claims, 7 Drawing Sheets

U.S. PATENT DOCUMENTS

| | | | |
|---|---|---|---|
| 5,066,939 A | 11/1991 | Mansfield | |
| 5,093,828 A | 3/1992 | Braun et al. | |
| 5,148,144 A | 9/1992 | Sutterlin et al. | |
| 5,192,231 A | 3/1993 | Dolin | |
| 5,351,272 A | 9/1994 | Abraham | |
| 5,452,344 A | 9/1995 | Larson | |
| 5,491,463 A | 2/1996 | Sargeant et al. | |
| 5,652,893 A | 7/1997 | Ben Meir et al. | |
| 5,684,826 A | 11/1997 | Ratner | |
| 5,689,230 A | 11/1997 | Merwin et al. | |
| 5,799,196 A | 8/1998 | Flannery | |
| 5,828,293 A | 10/1998 | Rickard | |
| 5,835,005 A | 11/1998 | Furukawa et al. | |
| 5,859,596 A | 1/1999 | McRae | |
| 5,884,086 A | 3/1999 | Amoni et al. | |
| 5,949,974 A | 9/1999 | Ewing | |
| 5,991,885 A | 11/1999 | Chang | |
| 5,994,998 A | 11/1999 | Fisher et al. | |
| 6,033,101 A | 3/2000 | Reddick et al. | |
| 6,115,468 A | 9/2000 | DeNicolo | |
| 6,125,448 A | 9/2000 | Schwan et al. | |
| 6,140,911 A | 10/2000 | Fisher et al. | |
| 6,218,930 B1 | 4/2001 | Katzenberg et al. | |
| 6,243,818 B1 | 6/2001 | Schwan et al. | |
| 6,295,356 B1 | 9/2001 | De Nicolo | |
| 6,301,527 B1 | 10/2001 | Butland | |
| 6,329,906 B1 | 12/2001 | Fisher et al. | |
| 6,348,874 B1 | 2/2002 | Cole | |
| 6,377,874 B1 | 4/2002 | Ykema | |
| 6,393,607 B1 | 5/2002 | Hughes et al. | |
| 6,473,608 B1 | 10/2002 | Lehr et al. | |
| 6,480,510 B1 | 11/2002 | Binder | |
| 6,496,105 B2 | 12/2002 | Fisher et al. | |
| 6,643,566 B1 | 11/2003 | Lehr et al. | |
| 6,753,761 B2 | 6/2004 | Fisher et al. | |
| 2001/0003207 A1* | 6/2001 | Kling et al. | 713/320 |
| 2003/0058085 A1 | 3/2003 | Fisher et al. | |
| 2003/0157955 A1* | 8/2003 | Jarvisalo et al. | 455/522 |
| 2005/0049758 A1 | 3/2005 | Lehr et al. | |
| 2005/0138438 A1* | 6/2005 | Bodas | 713/300 |
| 2005/0149768 A1* | 7/2005 | Kwa et al. | 713/300 |
| 2006/0259791 A1* | 11/2006 | Dockser | 713/300 |
| 2008/0052546 A1* | 2/2008 | Schindler et al. | 713/300 |

OTHER PUBLICATIONS

Bearfield, J.M., "Control the Power Interface of USB's Voltage Gus", Electronic Design, U.S., Penton Publishing, Clev. Ohio, vol. 45, No. 15, Jul. 1997 p. 80-86.

RAD Data Comm. Ltd., "Token Ring Design Guide", 1994, #TR-20-01/94, Chapters 1 through 4-21.

PowerDsine Product Catalogue 1999, pp. 56-79 and 95-105, Israel.

Universal Serial Bus Specification—Rev 1.0, Jan. 15, 1996; Sec 4.2.1 pp. 29-30; Sec 7.2.1-7.2.1.5 pp. 131-135; Sec. 9.2.1.-9.2.5.1 pp. 170-171; Sec 9.6.2 pp. 184-185.

IEEE Standards—802.3af-2003, pp. 36-57 (sections 33.2.3.7-33.3.6.1), p. 94-96; p. 102, p. 115, published Jun. 18, 2003, New York.

* cited by examiner

REDUCED GUARD BAND FOR POWER OVER ETHERNET

CROSS-REFERENCE TO RELATED APPLICATIONS

This application claims priority from U.S. Provisional Patent Application Ser. No. 60/865,432 filed Nov. 12, 2006, entitled "Reduced Guard Band for Power Over Ethernet", the entire contents of which are incorporated herein by reference.

BACKGROUND OF THE INVENTION

The present invention relates to the field of power over Ethernet and more particularly to a power over Ethernet system exhibiting a dynamic guard band preventing powering of additional ports.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to: reduced cost of installation; centralized power and power back-up; and centralized security and management.

Several patents addressed to this issue exist including: U.S. Pat. No. 6,473,608 issued to Lehr et al., whose contents are incorporated herein by reference, and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference, and is referred to hereinafter as the "af" standard. A device receiving power over the network wiring is referred to as a powered device (PD) and the powering equipment delivering power into the network wiring for use by the PD is referred to as a power sourcing equipment (PSE).

Commercially available PSEs are supplied supporting a single port, or supporting a plurality of ports. For clarity, each port of a power over Ethernet (PoE) controller serving a plurality of ports is referred to as a PSE and exhibits electrical characteristics as described in the "af" standard.

A PoE controller serving a plurality of ports preferably is provided with a power management functionality which prevents powering of ports when the total power consumption of all ports drawing power is within a predetermined range of the available overall power. In an exemplary embodiment this is accomplished by providing a guard band as described in copending U.S. patent application Ser. No. 10/949,208 filed Sep. 27, 2004 entitled "METHOD AND APPARATUS FOR POWER MANAGEMENT IN A LOCAL AREA NETWORK", published as US 2005/0049758 A1, the entire contents of which is incorporated herein by reference. In an exemplary embodiment the guard band is equal to, or greater than, the maximum power which may be drawn by a port, or PD, disregarding the effect of inrush current. Thus, by implementing the guard band, no PD can be powered which would bring the total utilized power to be in excess of the total available power. It is to be understood that in the event the total utilized power is in excess of the total available power, unless power to at least one port is disabled, the power supply will overload and shut down.

The power management function further operates to monitor the total power consumption of the system. In the event that power consumption is within the guard band limit of the total available power, no additional PDs are powered. In the event that power consumption meets or exceed the total available power, or alternatively meets or exceeds a limit set below the total available power, PDs are disabled to reduce total power consumption. Preferably, PDs are disabled while maintaining priority, thus low priority PDs are disabled first, while higher priority PDs are powered.

Each PD is connected to a unique port of a particular power over Ethernet controller, and thus disabling the port is synonymous with disabling the PD.

The above mechanism is generally satisfactory, however in the event a small power supply is utilized, having a capacity on the order of 2-4 fully powered "af" ports, the guard band prevents utilization of a significant portion of the power supply capabilities. This is particularly problematic in the event that the attached PDs draw power well below the maximum allowed by the "af" standard, and thus a significant number of PDs could be powered in the absence of the above mentioned guard band.

What is needed, and not supplied by the prior art, is a method of dynamically providing a guard band which enables a maximal number of PDs to be powered without exceeding the capabilities of the power supply.

SUMMARY OF THE INVENTION

Accordingly, it is a principal object of the present invention to overcome the disadvantages of prior art. This is provided in the present invention by a method of dynamically assigning a guard band in response to a PD being powered and then disabled by a power management functionality indicative that total power drawn after powering of the PD is greater than the maximum available power. In one embodiment the guard band is set for all ports of the system, and in another embodiment the guard band is set for the port which was disabled.

In the embodiment in which the guard band is set on a system wide basis, the guard band is cleared by one of: total power consumption being less than total available power less the guard band; a PD connected to a port having higher priority than the port disabled by the power management functionality; and a predetermined time period has expired.

In the embodiment in which the guard band is set for the port which was disabled, the guard band is cleared by one of: a detection cycle in which no PD is detected connected to the port associated with the disabled PD: and a predetermined time period has expired; and total power consumption being less than total available power less the guard band.

In one embodiment the invention provides for a method of controlling a power over Ethernet system, the method comprising: sequentially powering a plurality of powered devices over communication cabling; determining a first total power consumption responsive to the powering of the plurality of powered devices; disabling, in the event that the determined first total power consumption exceeds a predetermined maximum power level, power from at least one of the powered plurality of powered devices thereby reducing power consumption to less than the predetermined maximum power level; defining, responsive to the disabling power, a connection power limit lower than the maximum power level by a guard band; monitoring a second total power consumption subsequent to the disabling power; and enabling power to a powered device only in the event the monitored second total power consumption is less than the connection power limit.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present embodiments enable a method of dynamically assigning a guard band in response to a PD being powered and then disabled by a power management functionality indicative that total power drawn after powering of the PD is greater than the maximum available power. In one embodiment the guard band is set for all ports of the system, and in another embodiment the guard band is set for the port which was disabled.

In the embodiment in which the guard band is set on a system wide basis, the guard band is cleared by one of: total power consumption being less than total available power less the guard band; a PD connected to a port having higher priority than the port disabled by the power management functionality; and a predetermined time period has expired.

In the embodiment in which the guard band is set for the port which was disabled, the guard band is cleared by one of: a detection cycle in which no PD is detected connected to the port associated with the disabled PD; and a predetermined time period has expired; and total power consumption being less than total available power less the guard band.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
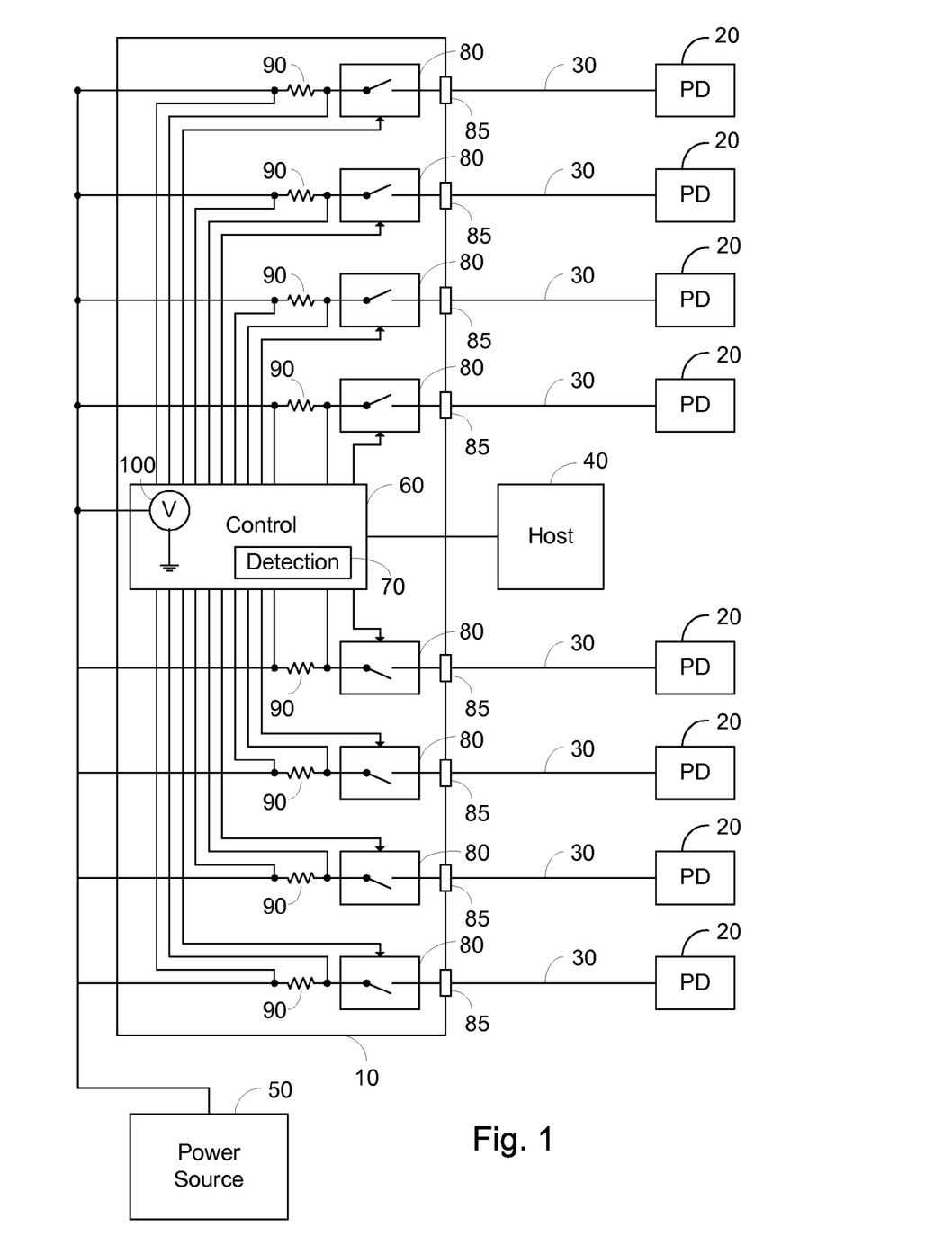
FIG. 1 is a high level schematic diagram of a power over Ethernet system comprising a power over Ethernet manager providing power to a plurality of powered devices over communication cabling.

FIG. 1 is a high level schematic diagram of a power over Ethernet system comprising a power over Ethernet manager 10 providing power to a plurality of powered devices 20 each over a respective communication cabling 30, further comprising a host 40 and a power source 50. Power over Ethernet manager 10 comprises a control circuitry 60, a detection functionality 70 associated with control circuitry 60, a plurality of electronically controlled switches 80 each associated with a particular port 85, a plurality of current sensors 90 illustrated as sense resistors, and a voltage sensor 100. The control input of each electronically controlled switch 80 is connected to a respective output of control circuitry 60, and the sense output of each of the current sensors 90 is connected to a respective input of control circuitry 60. In an embodiment in which current sensors 90 are each represented by a sense resistor, each end of sense resistor 90 is connected to a respective input control circuitry 60.

The output of power source 50 is connected in parallel to the input of each electronically controlled switch 80 via a respective current sensor 90. The output of each electronically controlled switch 80 is connected via a respective port 85 and a respective communication cabling 30 to a particular PD 20. There is no requirement that a PD 20 be connected to each port 85, and detection functionality 70 is operable, as will be described further hereinto below, to detect the presence or absence of a connected PD 20.

Each communication cabling 30 may be plugably connected, or directly connected, to a particular power over Ethernet manager 10 at each port 85. The combination of voltage sensor 100 and current sensors 90 represent a power sensor, operable to determine both total power consumption of all PDs 20 connected to power or the Ethernet manager 10 when current sensors 90 are used in combination, as well as to determine power consumption of each PD 20 drawing power from power over Ethernet manager 10 by the respective current sensor 90. Host 40 is in communication with control circuitry 60. In one embodiment host 40 is in communication with control circuitry 60 over the network, such as an Ethernet network, and in another embodiment host 40 is directly connected to control circuitry 60.

In operation, control circuitry 60 is in communication with host 40, and receives information regarding a maximum power output of power source 50. Control circuitry 60 further operates detection functionality 70 to detect the presence of a valid PD 20 connected over communication cabling 30 to each port 85, and responsive to detection of a valid PD 20 connected thereto, to close the respective electronically controlled switch 80 thereby powering PD 20 over communication cabling 30. Control circuitry 60 is further operable to monitor the power consumption of all powered PDs 20 and, as will be explained further hereinto below, to disable at least one PD 20 responsive to a power overload. It is to be understood that preferably power source 50 is utilized so as to power all, or a maximal number of, detected PDs 20 without exceeding its rated maximal capacity.

Figure 2A:
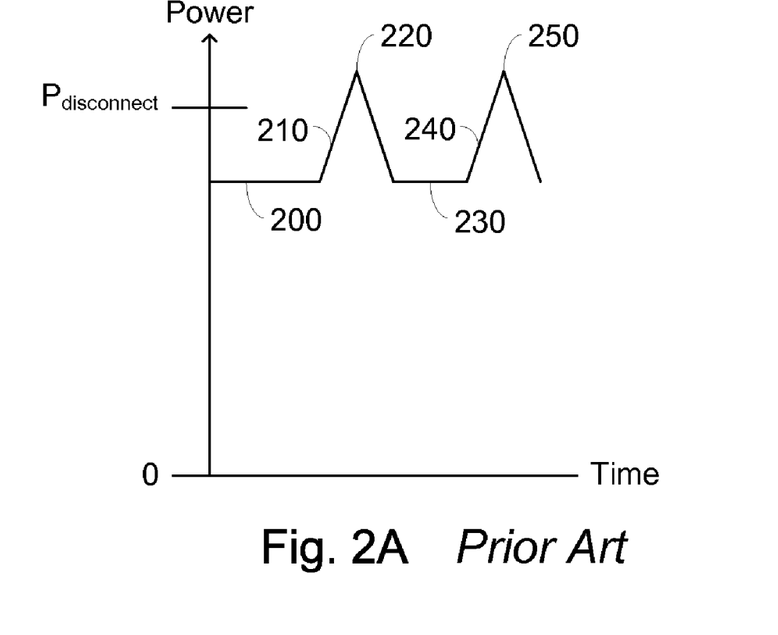
FIG. 2A is a depiction of a powered device oscillating between a powered state and a disabled state due to a power overload in accordance with the prior art.

The desire to power a maximal number of detected PDs 20, while not exceeding the capacity of power source 50, may lead to a situation where a PD 20 is alternatively powered and then disabled, since powering the PD 20 leads to an overload condition. FIG. 2A is a depiction of a powered device oscillating between a powered state and a disabled state due to a power overload in accordance with the prior art, in which the x-axis depicts time and the y-axis depicts overall power consumption of all PDs 20 drawing power from power over Ethernet manager 10. The maximum power output of power source 50 is marked as $P_{disconnect}$, since in the event overall power exceeds this amount at least one PD 20 is to be disabled, or disconnected, so as to prevent overload of power source 50.

Line 200 represents a steady state power consumption by one or more detected and powered PDs 20, the power consumption being less than $P_{disconnect}$. Line 210 represents the detection and powering of an additional PD 20, which when fully powered, preferably without taking into account any momentary inrush current, exceeds $P_{disconnect}$ as represented by point 220. Control circuitry 60 then functions to reduce power consumption by disabling at least one PD 20. It is to be understood that the term disabling is synonymous with opening electronically controlled switch 80 associated with port 85 and PD 20 for which power is to be removed.

Line 230 represents a steady state power consumption, similar to line 200, which is arrived at after the disconnection of the PD 20 which led to the overload condition of point 220. Control circuitry 60 typically polls all ports 85 to detect an unpowered PD 20 connected thereto, and in the event of detection, control circuitry 60 is operative to power the detected unpowered PD 20 as shown by line 240 which represents the detection and powering of the additional PD 20, which when fully powered, preferably without taking into account any momentary inrush current, exceeds $P_{disconnect}$ as represented by point 250. Control circuitry 60 then functions to reduce power consumption by disabling at least one PD 20 as described above.

Thus, detection functionality 70, the resultant powering of a detected PD 20, and the power management functionality preventing power overload, results in an oscillation between powering and disabling a PD 20.

Figure 2B:
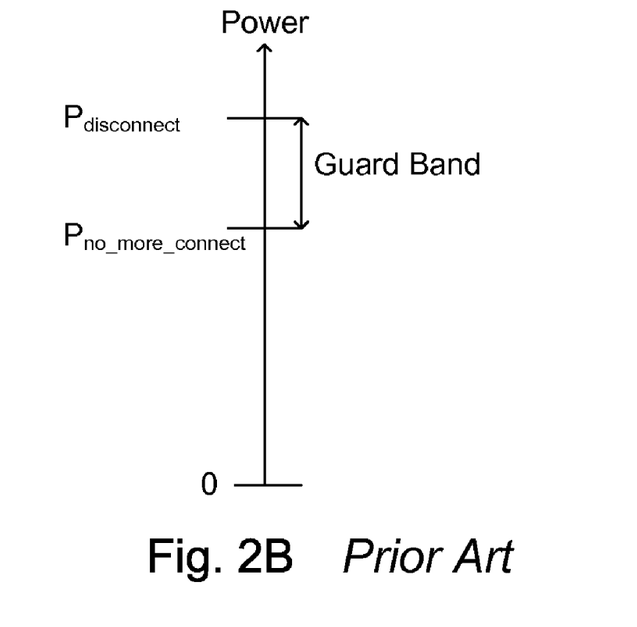
FIG. 2B is a depiction of a guard band in accordance with the prior art to prevent the oscillation of FIG. 2A.

To prevent such an oscillation, the prior art teaches the use of a guard band as described in U.S. patent application Ser. No. 10/949,208 filed Sep. 27, 2004 entitled "METHOD AND APPARATUS FOR POWER MANAGEMENT IN A LOCAL AREA NETWORK" published as US 2005/0049758 A1. FIG. 2B is a depiction of the guard band in accordance with the prior art to prevent the oscillation of FIG. 2A, in which a limit lower than $P_{disconnect}$ is defined, the lower limit denoted $P_{no\_more\_connect}$. The guard band is defined as the power range between $P_{disconnect}$ and $P_{no\_more\_connect}$.

In operation, detected PDs 20 are powered so long as the overall power consumption does not exceed $P_{no\_more\_connect}$. In the event overall power consumption exceeds $P_{no\_more\_connect}$, no additional detected PDs 20 are powered, however no powered PDs 20 are disabled. In the event overall power consumption exceeds $P_{disconnect}$, as described above in relation to FIG. 2A, at least one PD 20 is disabled to reduce power consumption below $P_{disconnect}$. The use of the guard band of FIG. 2B thus prevents the oscillation of FIG. 2A. However, it is to be understood that to be effective, the guard band of FIG. 2B is preferably sufficiently large to prevent the powering of the PD 20 which draws the maximum amount of power, and thus the use of a static guard band prevents a maximal usage of the capacity of power source 50.

Figure 3:
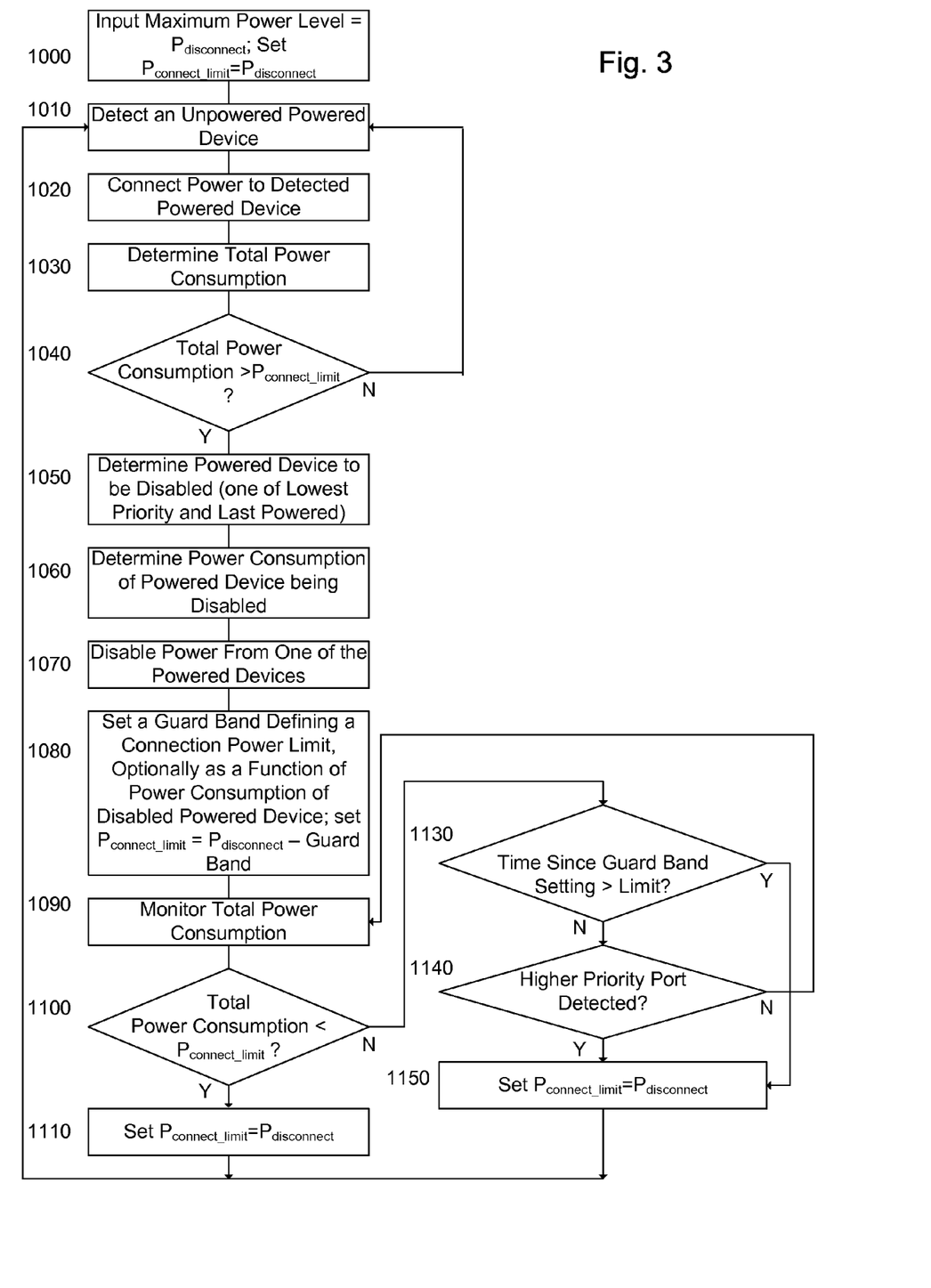
FIG. 3 is a high level flow chart of the operation of the control circuitry of FIG. 1, in accordance with a principal of the invention, in which a guard band is implemented for all ports of the system responsive to a single oscillation event.

FIG. 3 is a high level flow chart of the operation of control circuitry 60 of FIG. 1, in accordance with a principal of the invention, in which a guard band is dynamically implemented for all ports responsive to a single oscillation event. In stage 1000, a maximum power level of power source 50 is input. In one embodiment the maximum power level is communicated from host 40, and in another embodiment the maximum power level is communicated directly from power source 50 to control circuitry 60. The maximum power level is denoted $P_{disconnect}$. Additionally, a variable denoted $P_{connect\_limit}$ is set initially equal to $P_{disconnect}$.

In stage 1010, control circuitry 60 operates detection functionality 70 to detect a PD 20 which is currently unpowered. In stage 1020, control circuitry 60 operates the respective electronically controlled switch 80 to connect power to the detected PD 20 of stage 1010. In stage 1030, the total power consumption of all powered PDs 20 is determined. In an exemplary embodiment the total power consumption is determined by inputting the output of the various current sensors 90 and the output of voltage sensor 100, and multiplying the sum of the currents by the voltage. The current consumption of power over Ethernet manager 10, and in particular control circuitry 60, is preferably deducted as a constant. In an alternative embodiment the maximum power level provided by host 40 takes into account the current consumption of power over Ethernet manager 10.

The above has been described in relation to an embodiment in which a single voltage sensor 100 supplies voltage information for all ports of power over Ethernet manager 10, however this is not meant to be limiting in any way. In an alternative embodiment, the voltage at each port 85 is sensed by a respective voltage sensor (not shown) and input to control circuitry 60. The power consumption of each PD 20 is thus calculated by multiplying the current sensed by the respective current sensor 90 times the voltage sensed by the respective port voltage sensor.

In stage 1040, the total power consumption determined in stage 1030 is compared with Pdisconnect. In the event that total power consumption is not greater than Pdisconnect, stage 1010 as described above is performed. In the event that total power consumption is greater than Pdisconnect, in stage 1050 the PD 20 to be disabled, responsive to the overload condition detected in stage 1040, is determined. In one embodiment the last PD 20 to be powered in accordance with stage 1020 is determined to be the PD 20 to be disabled. In another embodiment the lowest priority port currently being powered is determined to be the port to be disabled. In stage 1060, power consumption of the PD 20 to be disabled in accordance with stage 1050 is determined. In one embodiment power consumption of the PD 20 to be disabled is determined responsive to the associated current sensor 90, and in another embodiment stage 1050 is calculated after the operation of stage 1070, described below, based on the reduced total power consumption as compared to the power consumption of stage 1030. In stage 1070, power flow to the PD 20 determined in stage 1050 is disabled. In an exemplary embodiment power flow is disabled by opening the respective electronically controlled switch 80.

In stage 1080, a guard band is set defining a connection power limit, whose operation is similar to that described above in relation to $P_{no\_more\_connect}$ of FIG. 2B. Preferably the guard band is a function of power consumption of the disabled powered device as determined in stage 1060. The variable $P_{connect\_limit}$ is set to be equal to $P_{disconnect}$ minus the determined guard band. Thus, the guard band is set by the operation of stage 1080 only in the event that power consumption has exceeded the initial maximum power level, $P_{disconnect}$. In one embodiment the guard band is equal to the power consumption of the disabled powered device as determined in stage 1060 plus a predetermined value. In one further embodiment the predetermined value is sufficient to prevent oscillation between states, and is preferably set on the order of 2 watts.

In stage 1090, the total power consumption is monitored. In stage 1100, the total power consumption monitored in stage 1090 is compared with the value represented by the variable $P_{connect\_limit}$. In the event that the monitored total power consumption is less then the value represented by $P_{connect\_limit}$, i.e. the total power consumption is below the guard band, in stage 1110 the variable $P_{connect\_limit}$ is reset to the initial value $P_{disconnect}$. Thus, in the event that the total power consumption is below the guard band, the guard band is cleared by the action of stage 1110 and stage 1010 as described above is performed.

In the event that in stage 1100 the total power consumption is not less than the value represented by the variable $P_{connect\_limit}$, in stage 1130 a timer representing the time since the operation of stage 1080 is compared with the predetermined time limit. In the event that the timer is indicative that time expired since the operation of stage 1080 is greater than the predetermined limit, in stage 1150 the variable $P_{connect\_limit}$ is reset to the initial value $P_{disconnect}$. Thus, in the event that a predetermined amount of time has expired since the setting of the guard band, the guard band is cleared by the action of stage 1150. Stage 1010 as described above is then performed.

In the event that in stage 1130 the timer is indicative that time expired since the operation of stage 1080 is not greater than the predetermined limit, in stage 1140 ports detected by detection functionality 70 are reviewed for priority. In the event that a port exhibiting a higher priority than the port determined in stage 1050 and disabled in stage 1070 has been detected, in stage 1150 the variable $P_{connect\_limit}$ is reset to the initial value $P_{disconnect}$. Thus, in the event that an unpowered PD 20 exhibiting a higher priority than the disabled port has been detected, the guard band is cleared by the action of stage 1150. Stage 1010 as described above is then performed. In the event that in stage 1140 a port exhibiting a higher priority than the port determined in stage 1050 and disabled in stage 1070 has not been detected, stage 1090 as described above is performed.

The operation of stages 1130, 1140 and 1150 described as being performed responsive to the comparing of stage 1100, however this is not meant to be limiting in any way. The operation of stages 1090 and 1100 may be performed continuously, with the action of stage 1130 and/or stage 1140 being performed responsive to appropriate interrupts, or calls, as described further below in relation to FIGS. 4B, 4C.

Figure 4A:
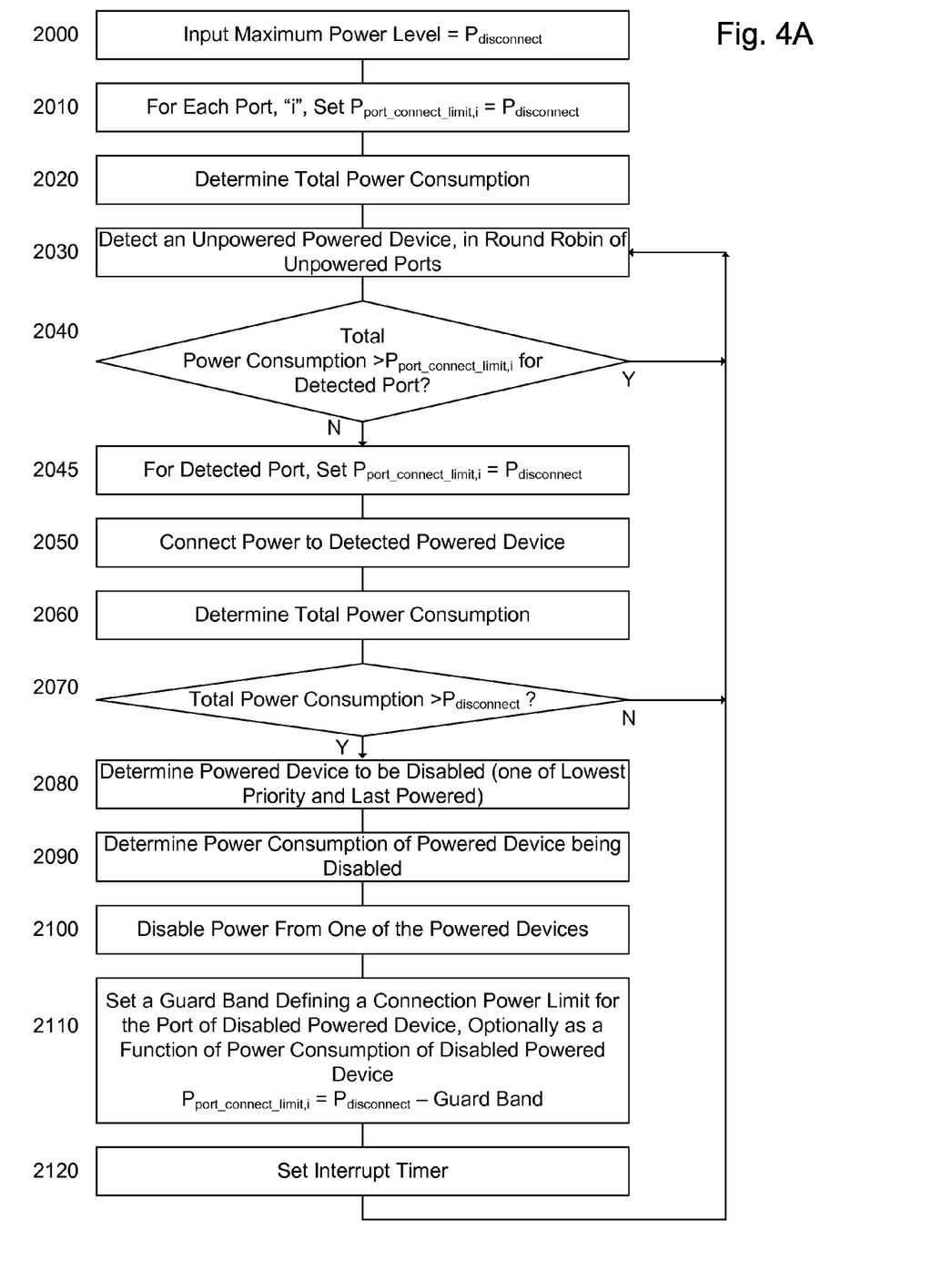
FIG. 4A is a high level flow chart of the operation of the control circuitry of FIG. 1, in accordance with the principle of the invention, in which a guard planned is implemented for the particular port responsive to a single oscillation event.

FIG. 4A is a high level flow chart of the operation of control circuitry 60 of FIG. 1, in accordance with the principle of the invention, in which a guard planned is implemented for the particular port responsive to a single oscillation event. In stage 2000, a maximum power level available from power source 50 is input. In one embodiment the maximum power level is communicated from host 40, and in another embodiment the maximum power level is communicated directly from power source 50 to control circuitry 60. A variable denoted $P_{disconnect}$ is set equal to the maximum available power level. In stage 2010, a variable associated with each port 85, denoted $P_{port\_connect\_limit,i}$ is set initially equal to $P_{disconnect}$ for each port, i.

In stage 2020, the total power consumption of all powered PDs 20 is determined. In an exemplary embodiment the total power consumption is determined by inputting the output of the various current sensors 90 and the output of voltage sensor 100, and multiplying the sum of the currents by the voltage. The current consumption of power over Ethernet manager 10, and in particular control circuitry 60, is preferably deducted as a constant. In an alternative embodiment the maximum power level provided by host 40 takes into account the current consumption of power over Ethernet manager 10.

In stage 2030, control circuitry 60 operates detection functionality 70 to detect a PD 20 which is currently unpowered. Preferably, control circuitry 60 operates detection functionality to detect an unpowered PD 20 in a round robin fashion taking into account all unpowered ports 85.

In stage 2040, the total power consumption determined in stage 2020 is compared with $P_{port\_connect\_limit,i}$ for the port, i, for which an unpowered PD 20 was detected in stage 2030. In the event that total power consumption is greater than $P_{port\_connect\_limit,i}$, stage 2030 as described above is performed. Thus, in the event power consumption is greater than a predetermined limit for the port, detection proceeds for other ports for which power consumption may not be greater than the predetermined limit for that port.

In the event that in stage 2040 total power consumption is not greater than $P_{port\_connect\_limit,i}$, optionally in stage 2045 $P_{port\_connect\_limit,i}$ for the detected port is set to be equal to $P_{disconnect}$. Thus, in the event that total power consumption is less the guard band, as represented by $P_{port\_connect\_limit,i}$, the guard band is reset to zero. In stage 2050 control circuitry 60 operates the respective electronically controlled switch 80 to connect power to the detected PD 20 of stage 2030. In stage 2060, the total power consumption of all powered PDs 20 is determined in a manner described above in relation to stage 2020.

In stage 2070, the total power consumption determined in stage 2060 is compared with $P_{disconnect}$. In the event that total power consumption is not greater than $P_{disconnect}$, stage 2030 as described above is performed. In the event that total power consumption is greater than $P_{disconnect}$, in stage 2080 the PD 20 to be disabled responsive to the overload condition detected in stage 2070 is determined. In one embodiment, the last PD 20 to be powered in accordance with stage 2050 is determined to be the PD 20 to be disabled. In another embodiment the lowest priority port currently being powered is determined to be the port to be disabled. In stage 2090, power consumption of the PD 20 to be disabled in accordance with stage 2080 is determined. In one embodiment power consumption of the PD 20 to be disabled is determined responsive to the associated current sensor 90, and in another embodiment stage 2090 is calculated after the operation of stage 2100 based on the reduced total power consumption as compared to the power consumption of stage 2060. In stage 2100 power flow to the PD 20 determined in stage 2080 is disabled. In an exemplary embodiment power flow is disabled by opening the respective electronically controlled switch 80.

In stage 2110, a guard band is set defining a connection power limit for the port disabled in stage 2100, whose operation is similar to that described above in relation to $P_{no\_more\_connect}$ of FIG. 2B. Preferably the guard band is a function of power consumption of the disabled powered device as determined in stage 2090. The variable $P_{port\_connect\_limit,i}$ is set to be equal to $P_{disconnect}$ minus the determined guard band. Thus, the guard band is set by the operation of stage 2110 only in the event that power consumption has exceeded the initial maximum power level, $P_{disconnect}$, and the guard band is set only for the port which was disabled responsive the power consumption exceeding the limit. In one embodiment the guard band is equal to the power consumption of the disabled powered device as determined in stage 2090 plus a predetermined value. In one further embodiment the predetermined value is sufficient to prevent oscillation between states, and is preferably set on the order of 2 watts.

In stage 2120 an interrupt timer is set, to automatically clear the guard band set in stage 2110 after a predetermined time period. In one embodiment a single interrupt timer is set for all occurrences of stage 2110, and in another embodiment an individual timer is set for each port for which a guard band is set, associated with the port. Stage 2030 is then performed, which may detect and power other unpowered ports.

Figure 4B:
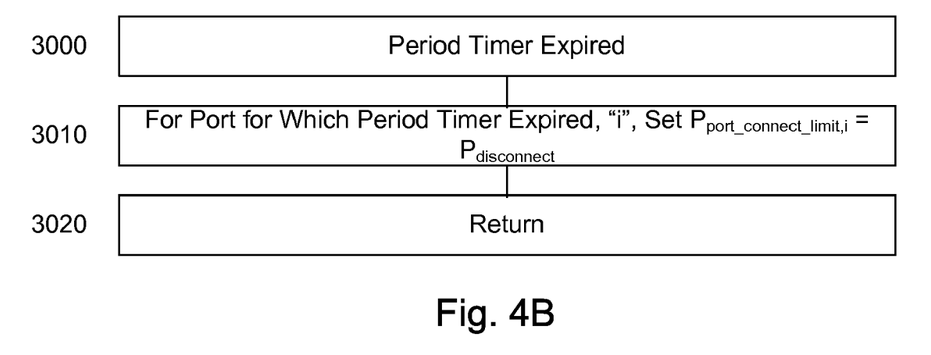
FIG. 4B is a high level flow chart of the operation of the control circuitry of FIG. 1, in accordance with the principle of the invention, to clear the guard band responsive to a timer.

FIG. 4B is a high level flow chart of the operation of the control circuitry of FIG. 1, in accordance with the principle of the invention, to clear the guard band responsive to the timer set in stage 2120 of FIG. 4A. In stage 3000, the time has expired calling the routine. In stage 3010, for the port for which the timer has expired, set $P_{port\_connect\_limit,i}$ to $P_{disconnect}$, i.e. reset the guard band to zero. In the embodiment in which a single timer is set, after a predetermined period in which stage 2120 has not been performed for any port, the guard band is reset to zero for all ports. In stage 3020 the routine returns.

Figure 4C:
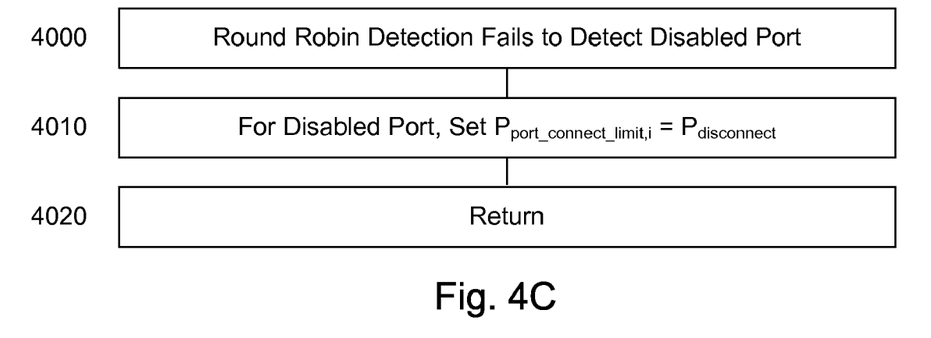
FIG. 4C is a high level flow chart of the operation of the control circuitry of FIG. 1, in accordance with the principle of the invention, to clear the guard band responsive to detection that the disabled powered device is no longer connected.

FIG. 4C is a high level flow chart of the operation of the control circuitry of FIG. 1, in accordance with the principle of the invention, to clear the guard band responsive to detection that the disabled powered device is no longer connected. In the event that the round robin detection of stage 2030 has detected that the disabled port of stage 2100 is no longer connected, the routine of FIG. 4C is called as described at stage 4000. In stage 4010, for the port 85 which was disabled in stage 2100 of FIG. 4A and for which stage 2030 has detected that the PD 20 is no longer connected, set $P_{port\_connect\_limit,i}$ to $P_{disconnect}$, i.e. clear the guard band. Thus, in the event that the PD 20 which was disabled responsive to the overload condition of stage 2070 is disconnected, the port guard band is reset to zero.

Figure 5:
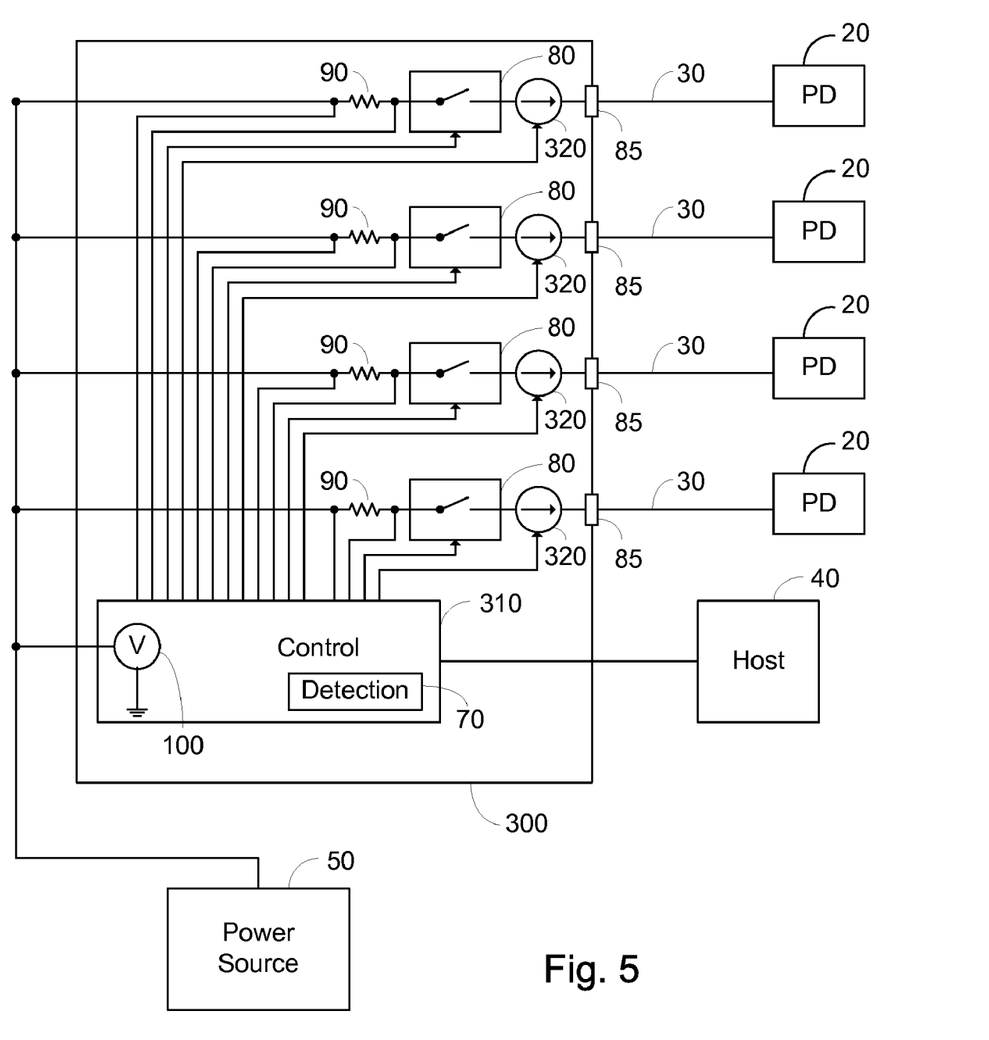
FIG. 5 is a high level schematic diagram of a power over Ethernet system comprising a power over Ethernet manager providing power to a plurality of powered devices over communication cabling, each of the ports comprising an electronically controlled switch and a variable current limiter in accordance with a principle of the invention.

FIG. 5 is a high level schematic diagram of a power over Ethernet system comprising a power over Ethernet manager 300 providing power to a plurality of powered devices 20 over a respective communication cabling 30, further comprising a host 40 and a power source 50. Power over Ethernet manager 300 comprises a control circuitry 310, a detection functionality 70 associated with control circuitry 310, a plurality of electronically controlled switches 80 and a plurality of variable current limiters 320 each associated with a particular port 85, a plurality of current sensors 90 illustrated as sense resistors, and a voltage sensor 100. The control input of each electronically controlled switch 80 is connected to a respective output of control circuitry 310, the sense output of each of the current sensors 90 is connected to a respective input of control circuitry 310, and the control input of each of the variable current limiters 320 is connected to a respective output of control circuitry 310. In an embodiment in which current sensors 90 are each represented by a sense resistor, as illustrated, each end of sense resistor 90 is connected to a respective input control circuitry 310.

The output of power source 50 is connected in parallel to the input of each electronically controlled switch 80 via a respective current sensor 90. The output of each electronically controlled switch 80 is connected through a respective variable current limiter 320 via a respective port 85 and a respective communication cabling 30 to a particular PD 20. There is no requirement that a PD 20 be connected to each port 85, and detection functionality 70 is operable, as will be described further hereinto below, to detect the presence or absence of a connected PD 20. Host 40 is in communication with control circuitry 310. In one embodiment host 40 is in communication with control circuitry 310 over the network, such as an Ethernet network, and in another embodiment host 40 is directly connected to control circuitry 310.

Each communication cabling 30 may be plugably connected, or directly connected, to power over Ethernet manager 300 at a particular port 85. The combination of voltage sensor 100 and current sensors 90 represent a power sensor, operable to determine both total power consumption of all PDs 20 connected to power or the Ethernet manager 300 when current sensors 90 are used in combination, as well as to determine power consumption of each PD 20 drawing power from power over Ethernet manager 300 by the respective current sensor 90.

Electronically controlled switch 80 and variable current limiter 320 are illustrated as separate elements, however this is not meant to be limiting in any way. In one embodiment, electronically controlled switch 80 and variable current limiter 320 are constituted of a single FET, or other transistor, in cooperation with a comparator, whose gate is controlled to produce alternatively a current limiting functionality in cooperation with current sensor 90, an open switch condition and a closed switch condition.

In operation, control circuitry 310 is in communication with host 40, and receives information regarding a maximum power output of power source 50. Control circuitry 310 further operates detection functionality 70 to detect the presence of a valid PD 20 connected over communication cabling 30 to each port 85, and responsive to detection of a valid PD 20 connected thereto, to close the respective electronically controlled switch 80 thereby powering PD 20 over communication cabling 30. Control circuitry 310 further sets variable current limiter 320 to an appropriate current limit so as to limit the current drawn by PD 20 to be within a predetermined limit. Control circuitry 310 is further operable to monitor the power consumption of all powered PDs 20 and, as will be explained further hereinto below, to disable at least one PD 20 responsive to a power overload. It is to be understood that preferably power source 50 is utilized so as to power all, or a maximal number of, detected PDs 20 without exceeding its rated maximal capacity.

Host 40 may communicate a request for increased power received over the network from one or more PD 20. Control circuitry 310, responsive to the request for increased power, the total power consumption and the maximum power available, determines whether increased power is to be allocated. In the event that increased power is to be allocated, control circuitry 310 responds to PD 20 via host 40 with an authorization, and in an exemplary embodiment sets variable current limiter 320 to an appropriate limit for the increased power.

The above has been described in an embodiment in which a variable current limiter 320 is set to an appropriate current limit so as to enforce a power allocation to PD 20 by controlling the current to be no more than a predetermined limit, however this is not meant to be limiting in any way. In another embodiment, variable current limiter 320 is only set to values appropriate to control for overload conditions, as described for example in the above mentioned IEEE 802.3af-2003 specification.

Figure 6:
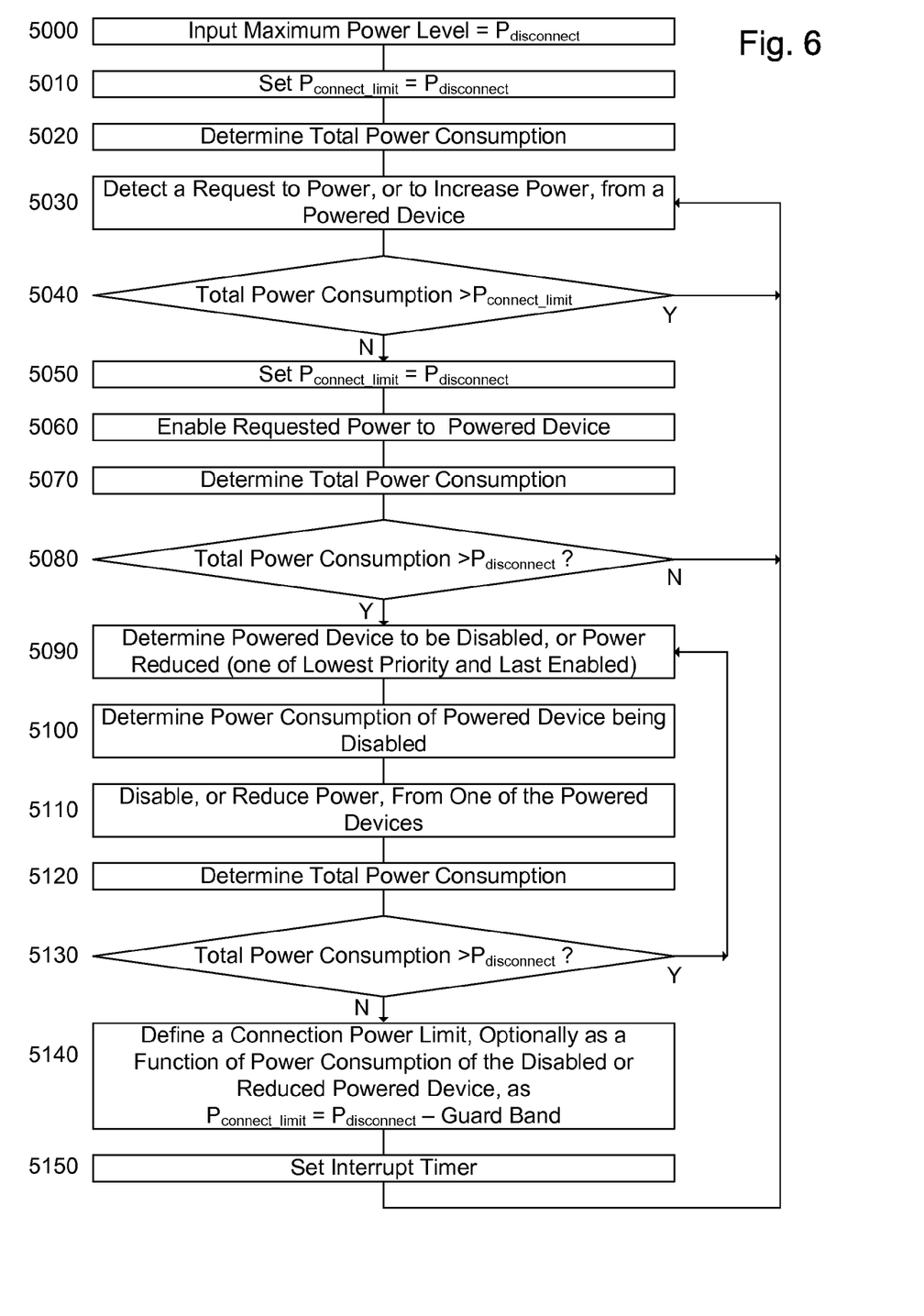
FIG. 6 is a high level flow chart of the operation of the control circuitry of FIG. 5, in accordance with a principal of the invention, in which a guard band is implemented for all ports of the system responsive to a single oscillation event.

FIG. 6 is a high level flow chart of the operation of control circuitry 310 of FIG. 5, in accordance with a principal of the invention, in which a guard band is implemented for all ports 85 of the system responsive to a single oscillation event. In stage 5000, a maximum power level available from power source 50 is input. In one embodiment the maximum power level is communicated from host 40, and in another embodiment the maximum power level is communicated directly from power source 50 to control circuitry 60. A variable denoted $P_{disconnect}$ is set equal to the maximum available power level. In stage 5010, a variable denoted $P_{connect\_limit}$ is set initially equal to $P_{disconnect}$.

In stage 5020, the total power consumption of all powered PDs 20 is determined. In an exemplary embodiment the total power consumption is determined by inputting the output of the various current sensors 90 and the output of voltage sensor 100, and multiplying the sum of the currents by the voltage. The current consumption of power over Ethernet manager 300, and in particular control circuitry 310, is preferably deducted as a constant. In an alternative embodiment the maximum power level provided by host 40 takes into account the current consumption of power over Ethernet manager 300.

In stage 5030, control circuitry 310 operates detection functionality 70 to detect a PD 20 which is currently unpowered. Preferably, control circuitry 310 operates detection functionality to detect an unpowered PD 20 in a round robin fashion taking into account all unpowered ports 85. Stage 5030 may also comprise receipt of a request for increased power from one or more PD 20 via host 40.

In stage 5040, the total power consumption determined in stage 5020 is compared with $P_{connect\_limit}$. In the event that total power consumption is greater than $P_{connect\_limit}$, stage 5030 as described above is again performed. Thus, in the event power consumption is greater than the connection power limit, a request for increased power or the powering of a detected unpowered powered device is not implemented.

In the event that in stage 5040 total power consumption is not greater than $P_{connect\ limit}$, in stage 5050 $P_{connect\ limit}$ is reset to the default value, $P_{disconnect}$. Thus, in the event that total power consumption is less the guard band, as represented by $P_{connect\_limit}$, and will be described further below, the guard band is reset to zero. In stage 5060, in the event the power requested in stage 5030 was of a detected unpowered powered device, control circuitry 310 operates the respective electronically controlled switch 80 to connect power to the detected PD 20. In the event the power requested in stage 5030 was of a powered device requesting an increased power, in an exemplary embodiment control circuitry 310 operates the respective variable current limiter 320 to increase the current limit to the PD 20 requesting the increased power.

In stage 5070, the total power consumption of all powered PDs 20 is determined in a manner described above in relation to stage 5020. In stage 5080, the total power consumption determined in stage 5070 is compared with $P_{disconnect}$. In the event that total power consumption is not greater than $P_{disconnect}$, stage 5030 as described above is performed. Thus, in the event total power consumption is less than the maximum power available, additional detected powered devices may be powered and/or additional power requests may be honored.

In the event that in stage 5080 total power consumption is greater than $P_{disconnect}$, in stage 5090 the PD 20 to be disabled responsive to the overload condition detected in stage 5080 is determined. In one embodiment, the last PD 20 to be powered, or have power increased, in accordance with stage 5060 is determined to be the PD 20 to be disabled, or have the allocated power reduced. In another embodiment the lowest priority port currently being powered is determined to be the port to be disabled, or have the allocated power reduced. In stage 5100, power consumption of the PD 20 to be disabled, or have power reduced, in accordance with stage 5090 is determined. In one embodiment power consumption of the PD 20 to be disabled is determined responsive to the associated current sensor 90, and in another embodiment stage 5100 is calculated after the operation of stage 5110, described below, based on the reduced total power consumption read in stage 5120, as described below, as compared to the determined power consumption of stage 5070. In stage 5110 power flow to the PD 20 determined in stage 5090 is disabled, or reduced. In an exemplary embodiment power flow is disabled by opening the respective electronically controlled switch 80, and power is reduced by setting the respective variable current limiter 320.

In stage 5120, the total power consumption of all powered PDs 20 is determined. In an exemplary embodiment the total power consumption is determined by inputting the output of the various current sensors 90 and the output of voltage sensor 100, and multiplying the sum of the currents by the voltage. The current consumption of power over Ethernet manager 300, and in particular control circuitry 310, is preferably deducted as a constant. In an alternative embodiment the maximum power level provided by host 40 takes into account the current consumption of power over Ethernet manager 300.

In stage 5130, the total power consumption determined in stage 5120 is compared with $P_{disconnect}$. In the event that total power consumption is greater than $P_{disconnect}$, i.e. the operation of stage 5110 was insufficient to reduce power consumption to below the overload of $P_{disconnect}$, stage 5090 as described above is performed to disable another port 85, or reduce power from another PD 20.

In the event that in stage 5130 total power consumption is not greater than $P_{disconnect}$, in stage 5140, a guard band is set defining a connection power limit, whose operation is similar to that described above in relation to $P_{no\_more\_connect}$ of FIG. 2B. Preferably the guard band is a function of power consumption of the disabled powered device determined in stage 5090. The variable $P_{connect\_limit}$ is set to be equal to $P_{disconnect}$ minus the determined guard band. In one embodiment the guard band is equal to the power consumption of the disabled powered device, or the reduced power, as determined in stage 5100 plus a predetermined value. In one further embodiment the predetermined value is sufficient to prevent oscillation between states, and is preferably set on the order of 2 watts.

In stage 5150 an interrupt timer is set, to automatically clear the guard band set in stage 5140 after a predetermined time period. Stage 5030 is then performed, which may detect and power other unpowered ports or increase power as requested.

Thus, the present embodiments enable a method of dynamically assigning a guard band in response to a PD being powered and then disabled by a power management functionality indicative that total power drawn after powering of the PD is greater than the maximum available power. In one embodiment the guard band is set for all ports of the system, and in another embodiment the guard band is set for the port which was disabled.

In the embodiment in which the guard band is set on a system wide basis, the guard band is cleared by one of: total power consumption being less than total available power less the guard band; a PD connected to a port having higher priority than the port disabled by the power management functionality; and a predetermined time period has expired.

In the embodiment in which the guard band is set for the port which was disabled, the guard band is cleared by one of: a detection cycle in which no PD is detected connected to the port associated with the disabled PD; a predetermined time period has expired; and total power consumption being less than total available power less the guard band.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method of controlling a power over Ethernet system, the method comprising:
   sequentially powering a plurality of powered devices over communication cabling;
   determining a first total power consumption responsive to said powering of said plurality of powered devices;
   disabling, in the event that said determined first total power consumption exceeds a predetermined maximum power level, power from at least one of said powered plurality of powered devices thereby reducing power consumption to less than said predetermined maximum power level;
   determining the power consumption of said at least one powered device being disabled;
   defining, responsive to said disabling power, a connection power limit lower than said maximum power level by a guard band, wherein said guard band is a function of said determined power consumption of said at least one powered device being disabled;
   monitoring a second total power consumption subsequent to said disabling power; and
   enabling power to a powered device only in the event said monitored second total power consumption is less than said connection power limit.

2. A method according to claim 1, further comprising:
   setting said guard band to zero after a predetermined period from said disabling power.

3. A method according to claims 1, further comprising:
   detecting an unpowered powered device associated with a higher priority than the priority associated with said at least one powered device having said power disabled; and
   setting, responsive to said detected powered device, said guard band to zero.

4. A method according to claim 1, further comprising:
   detecting a request to increase allocated power to a powered device associated with a higher priority than the priority associated with said at least one powered device having said power disabled; and
   setting, responsive to said detected request, said guard band to zero.

5. A method according to claim 1, further comprising in the event said monitored second total power consumption is less than said connection power limit, setting said guard band to zero.

6. A method according to claim 1, wherein said at least one powered device having said power disabled comprises one of:
   a last powered device of said sequentially powered plurality of powered devices; and
   a lowest priority powered device of said sequentially powered plurality of powered devices.

7. A method according to claim 1, wherein said enabling power comprising increasing an allocated power to said powered device.

8. A method of controlling a power over Ethernet system, the method comprising:
   sequentially powering a plurality of powered devices over communication cabling;
   determining a first total power consumption responsive to said powering of said plurality of powered devices;
   disabling, in the event that said determined first total power consumption exceeds a predetermined maximum power level, power from at least one of said powered plurality of powered devices thereby reducing power consumption to less than said predetermined maximum power level;
   determining the power consumption when powered of each of said disabled at least one powered device;
   defining, responsive to said disabling power, a connection power limit lower than said maximum power level by a guard band, wherein said defined connection power limit is associated with each powered device having said power disabled, said defined connection power limit being defined individually for each disabled at least one powered device as a function of said determined power consumption;
   monitoring a second total power consumption subsequent to said disabling power; and
   enabling power to a powered device only in the event said monitored second total power consumption is less than said connection power limit.

9. A method of controlling a power over Ethernet system, the method comprising:
   sequentially powering a plurality of powered devices over communication cabling, each of said powered plurality of powered devices being associated with a unique port;
   determining a total power consumption responsive to said powering of said plurality of powered devices;

disabling power, in the event that said determined total power consumption exceeds a predetermined maximum power level, from one of said plurality of powered devices;

defining, responsive to said disabling power, a connection power limit lower than said maximum power level by a guard band, said guard band being associated with the unique port associated with said powered device having said power disabled;

monitoring total power consumption subsequent to said disabling power; and powering, in the event said monitored total power consumption subsequent to said disabling power is less than said connection power limit, said powered device having said power disabled.

10. A method according to claim 9, further comprising:

detecting that no powered device is connected to the unique port associated with said powered device having said power disabled; and setting, responsive to said detecting that no powered device is connected, said guard band to zero.

11. A method according to claims 9, further comprising:

setting said guard band to zero responsive to one of:

said monitored total power consumption being less than said connection power limit; and a predetermined period elapsing from said disabling power.

12. A power over Ethernet manager, comprising:

a power over Ethernet control circuitry;

a plurality of ports, each of said ports having associated therewith one of a switch and a variable current limiter responsive to said power over Ethernet control circuitry; and at least one power sensor, in communication with said power over Ethernet control circuitry, and operative to sense an amount of power drawn via each of said plurality of ports, said power over Ethernet control circuitry being operative to:

sequentially power a plurality of powered devices each connected to particular one of said plurality of ports over communication cabling;

determine, via said at least one power sensor, a first total power consumption responsive to said sequentially powered plurality of powered devices;

disable, in the event that said determined first total power consumption exceeds a predetermined maximum power level, via the operation of said associated one of a switch and a variable current limiter, power from at least one of said powered plurality of powered devices thereby reducing power consumption to less than said predetermined maximum power level;

determine the power consumption when operating of said at least one powered device being disabled;

define, responsive to said disabled power, a connection power limit lower than said maximum power level by a guard band, wherein said guard band is a function of said determined power consumption of said at least one powered device having said power disabled;

monitor, via said at least one power sensor, a second total power consumption subsequent to said disabled power; and enable, via said associated one of a switch and a variable current limiter, power to a powered device only in the event said monitored second total power consumption is less than said connection power limit.

13. A power over Ethernet manager according to claim 12, wherein said power over Ethernet control circuitry is further operative to set said guard band to zero responsive to one of:

a predetermined time elapsing from said disabling of power; and said monitored second total power consumption being less than said connection power limit.

14. A power over Ethernet manager according to claim 12, further comprising a detection functionality responsive to said power over Ethernet control circuitry, and wherein said power over Ethernet control circuitry is further operative to:

detect, via said detection functionality, an unpowered powered device associated with a higher priority than the priority associated with said disabled at least one powered device; and set said guard band to zero, responsive to said detected powered device.

15. A power over Ethernet manager according to claim 12, wherein said power over Ethernet control circuitry is further operative to:

detect a request to increase allocated power to a powered device associated with a higher priority than the priority associated with said disabled at least one powered device; and set said guard band to zero, responsive to said detected request.

16. A power over Ethernet manager according to claim 12, wherein said disabled at least one powered device comprises one of:

a last powered device of said sequentially powered plurality of powered devices; and a lowest priority powered device of said sequentially powered plurality of powered devices.

17. A power over Ethernet manager according to claim 12, wherein said enabling of power comprises increasing an allocated power to said powered device by setting said variable current limiter.

18. A power over Ethernet manager, comprising:

a power over Ethernet control circuitry;

a plurality of ports, each of said ports having associated therewith one of a switch and a variable current limiter responsive to said power over Ethernet control circuitry; and at least one power sensor, in communication with said power over Ethernet control circuitry, and operative to sense an amount of power drawn via each of said plurality of ports, said power over Ethernet control circuitry being operative to:

sequentially power a plurality of powered devices each connected to particular one of said plurality of ports over communication cabling;

determine, via said at least one power sensor, a first total power consumption responsive to said sequentially powered plurality of powered devices;

disable, in the event that said determined first total power consumption exceeds a predetermined maximum power level, via the operation of said associated one of a switch and a variable current limiter, power from at least one of said powered plurality of powered devices thereby reducing power consumption to less than said predetermined maximum power level;

determine, via said at least one power sensor, the power consumption of each of said disabled at least one powered device, define, responsive to said disabled power, a connection power limit lower than said maximum power level by a guard band, wherein said defined connection power limit is associated with each powered device having said power disabled, said defined connection power limit being defined individually for each disabled at least one powered device as a function of said determined power consumption;

monitor, via said at least one power sensor, a second total power consumption subsequent to said disabled power; and enable, via said associated one of a switch and a variable current limiter, power to a powered device only in the event said monitored second total power consumption is less than said connection power limit.

19. A power over Ethernet manager, comprising:

a power over Ethernet control circuitry;

a plurality of ports, each of said ports having associated therewith an electronically controlled switch responsive to said power over Ethernet control circuitry; and at least one power sensor, in communication with said power over Ethernet control circuitry, and operative to sense an amount of power drawn via each of said plurality of ports, said power over Ethernet control circuitry being operative to:

power a plurality of powered devices each connected to particular one of said plurality of ports over communication cabling;

determine, via said at least one power sensor, a first total power consumption responsive to said powered plurality of powered devices;

disable, in the event that said determined first total power consumption exceeds a predetermined maximum power level, via the operation of said associated electronically controlled switch, power from one of said powered plurality of powered devices;

define, responsive to said disabled power, a connection power limit for the port associated with said disabled one of said powered device, said connection power limit being lower than said maximum power level by a guard band;

monitor, via said at least one power sensor, a second total power consumption subsequent to said disabled power; and enable, via said associated electronically controlled switch, power to said disabled one of said powered devices only in the event said monitored second total power consumption is less than said connection power limit.

20. A power over Ethernet manager according to claim 19, further comprising a detection functionality responsive to said power over Ethernet control circuitry, said power over Ethernet control circuitry being further operative to:

detect, via said detection functionality, that no powered device is connected to the port associated with said powered device having said power disabled; and set said guard band to zero, responsive to said detection.

21. A power over Ethernet manager according to claim 19, wherein said power over Ethernet control circuitry is further operative to set said guard band to zero responsive to one of:

said monitored total power consumption being less than said connection power limit; and a predetermined time elapsing from said disabling of power.

* * * * *